US010699035B2

(12) United States Patent
Nakhjavani

(10) Patent No.: US 10,699,035 B2
(45) Date of Patent: Jun. 30, 2020

(54) PART MANAGEMENT SYSTEM

(71) Applicant: The Boeing Company, Chicago, IL (US)

(72) Inventor: Omid B. Nakhjavani, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 159 days.

(21) Appl. No.: 15/638,967

(22) Filed: Jun. 30, 2017

(65) Prior Publication Data

US 2019/0005158 A1     Jan. 3, 2019

(51) Int. Cl.

| | | |
|---|---|---|
| *G06F 30/00* | (2020.01) | |
| *G06Q 10/06* | (2012.01) | |
| *G06Q 10/10* | (2012.01) | |
| *G06F 30/17* | (2020.01) | |
| *G06F 30/23* | (2020.01) | |
| *G06F 111/20* | (2020.01) | |
| *G06F 119/18* | (2020.01) | |

(52) U.S. Cl.
CPC ............. *G06F 30/00* (2020.01); *G06F 30/17* (2020.01); *G06F 30/23* (2020.01); *G06Q 10/06* (2013.01); *G06Q 10/10* (2013.01); *G06F 2111/20* (2020.01); *G06F 2119/18* (2020.01)

(58) Field of Classification Search
CPC .. G06F 17/50; G06F 17/5086; G06F 2217/02; G06F 2217/12; G06Q 10/06; G06Q 10/10
See application file for complete search history.

(56) References Cited

U.S. PATENT DOCUMENTS

| | | | | |
|---|---|---|---|---|
| 7,996,344 B1 * | 8/2011 | Goel | ....................... | G06F 17/50 706/13 |
| 2004/0138772 A1 * | 7/2004 | Barman | ............. | G05B 19/4097 700/97 |
| 2005/0131779 A1 * | 6/2005 | Kitamura | ......... | G05B 19/41865 705/29 |
| 2014/0288893 A1 * | 9/2014 | Blom | .................. | G06F 17/5018 703/1 |

* cited by examiner

*Primary Examiner* — Mohammad Ali
*Assistant Examiner* — Joshua T Sanders
(74) *Attorney, Agent, or Firm* — Yee & Associates, P.C.

(57) ABSTRACT

A method, system, and apparatus for managing a part design. The method comprises processing, by a computer system, a finite element model for a part to refine a part topology and generate a number of configurations, in which each configuration has a part weight and a number of different parameters that change the part weight and meet a specification for the part. The method analyzes a part geometry model and a selected manufacturing process to estimate a resource use for manufacturing the part. In response to determining that the part weight or the resource use for a configuration is unacceptable, the method iteratively edits the configuration, refines the part topology to generate an updated configuration, and analyzes the selected manufacturing process to estimate the resource use, until an optimized configuration is identified. The method outputs a file for the optimized configuration, enabling manufacturing of the part using the part design.

27 Claims, 9 Drawing Sheets

PART MANAGEMENT SYSTEM

BACKGROUND INFORMATION

1. Field

The present disclosure relates generally to manufacturing, and in particular, to a method and apparatus for manufacturing parts using a part management system.

2. Background

In producing products, such as an aircraft, parts are manufactured for use in assembling an aircraft. With aircraft, weight is often a concern. For example, aircraft are being designed and manufactured with greater and greater percentages of composite materials. Composite materials are used in aircraft to decrease the weight of the aircraft. This decreased weight improves performance features such as payload capacity and fuel efficiency.

In addition to the type of materials, the geometries and materials in a part design of the parts also may be varied to reduce weight while providing a level of performance that meets a specification. The specification may be from a manufacturer, a rule, a regulation, a statute, or some other source, or a combination thereof. Weight, however, is not the only factor in creating part designs for parts. Considerations such as environmental concerns, ease of manufacturing, maintenance, and other considerations may be present. Taking into account all of the considerations present may make creating part designs more time consuming and difficult than desired.

Therefore, it would be desirable to have a method and apparatus that take into account at least some of the issues discussed above, as well as other possible issues. For example, it would be desirable to have a method and apparatus that overcome a technical problem with creating optimal part designs that take into account the desired considerations for aircraft parts.

SUMMARY

An embodiment of the present disclosure provides a method for managing a part design. The method comprises processing, by a computer system, a finite element model for a part to refine a part topology and generate a number of configurations for the part in which each configuration in the number of configurations has a part weight and each configuration in the number of configurations for the part has a number of different parameters from other configurations for the part that change the part weight and meet a specification for the part. The method analyzes for each configuration, by the computer system, a part geometry model and a selected manufacturing process to estimate a resource use for manufacturing the part for each configuration in the number of configurations for the part. In response to determining, by the computer system, that the part weight or the resource use for a configuration is unacceptable, the method iteratively edits the configuration, refines the part topology to generate an updated configuration for the part, and analyzes the selected manufacturing process to estimate the resource use, until an optimized configuration is identified based on a number for part weights and the resource use estimated for the number of configurations processed by the computer system for the part. The method outputs, by the computer system, a file with the part design for the optimized configuration of the part, enabling manufacturing of the part using the part design.

Another embodiment of the present disclosure provides a part management system. The part management system comprises a structural analyzer, a manufacturing process evaluator, and an optimizer. The structural analyzer is configured to process a finite element model for a part to refine a part topology and generate a number of configurations for the part in which each configuration in the number of configurations has a part weight and each configuration in the number of configurations for the part has a number of different parameters from other configurations for the part that change the part weight and meet a specification for the part. The manufacturing process evaluator is configured to analyze, for each configuration, a part geometry model and a selected manufacturing process and estimate a resource use for manufacturing the part for each configuration in the number of configurations for the part. The optimizer is configured to iteratively edit a configuration in the number of configurations, refine the part topology to generate an updated configuration for the part, and analyze the selected manufacturing process to estimate the resource use until an optimized configuration is identified based on a number for part weights and the resource use estimated for the number of configurations processed by a computer system for the part and output a file with a part design for the optimized configuration of the part, enabling manufacturing of the part using the part design.

Yet another embodiment of the present disclosure provides a product management system. The product management system comprises a control system configured to process a finite element model for a part. The product management system refines a part topology and generates a number of configurations for the part in which each configuration in the number of configurations has a part weight and each configuration in the number of configurations for the part has a number of different parameters from other configurations for the part that change the part weight and meet a specification for the part. The product management system analyzes for each configuration, a part geometry model and a selected manufacturing process, to estimate a resource use for manufacturing the part for each configuration in the number of configurations for the part. The product management system iteratively edits a configuration, refines the part topology to generate an updated configuration for the part, and analyzes the selected manufacturing process to estimate the resource use until an optimized configuration is identified based on a number for part weights and the resource use estimated for the number of configurations processed by a computer system for the part and output a file with a part design for the optimized configuration of the part, enabling manufacturing of the part using the part design.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that current techniques do not identify and optimize a part design for a part based on both weight and resource use, at the same time.

Thus, the illustrative embodiments provide a method and apparatus for managing a part design. In one illustrative example, a method is present for managing a part design. A computer system processes a finite element model for a part to refine a part topology and generate a number of configurations for the part. Each configuration in the number of configurations has a part weight and each configuration in the number of configurations for the part has a number of different parameters from other configurations for the part that change the part weight and meet a specification for the part. For each configuration, a part geometry model and a selected manufacturing process is analyzed to estimate a resource use for manufacturing the part for each configuration in the number of configurations for the part.

In response to determining that the part weight or the resource use for a configuration is unacceptable, iteratively editing the configuration, the part topology is refined to generate an updated configuration for the part and the selected manufacturing process is analyzed to estimate the resource use until an optimized configuration is identified based on a number for part weights and the resource use estimated for the number of configurations processed by the computer system for the part. A file with a part design for the optimized configuration of the part is outputted, enabling manufacturing of the part using the part design. As used herein, a "number of" when used with reference to items means one or more items. For example, a number of configurations is one or more configurations.

Figure 1:
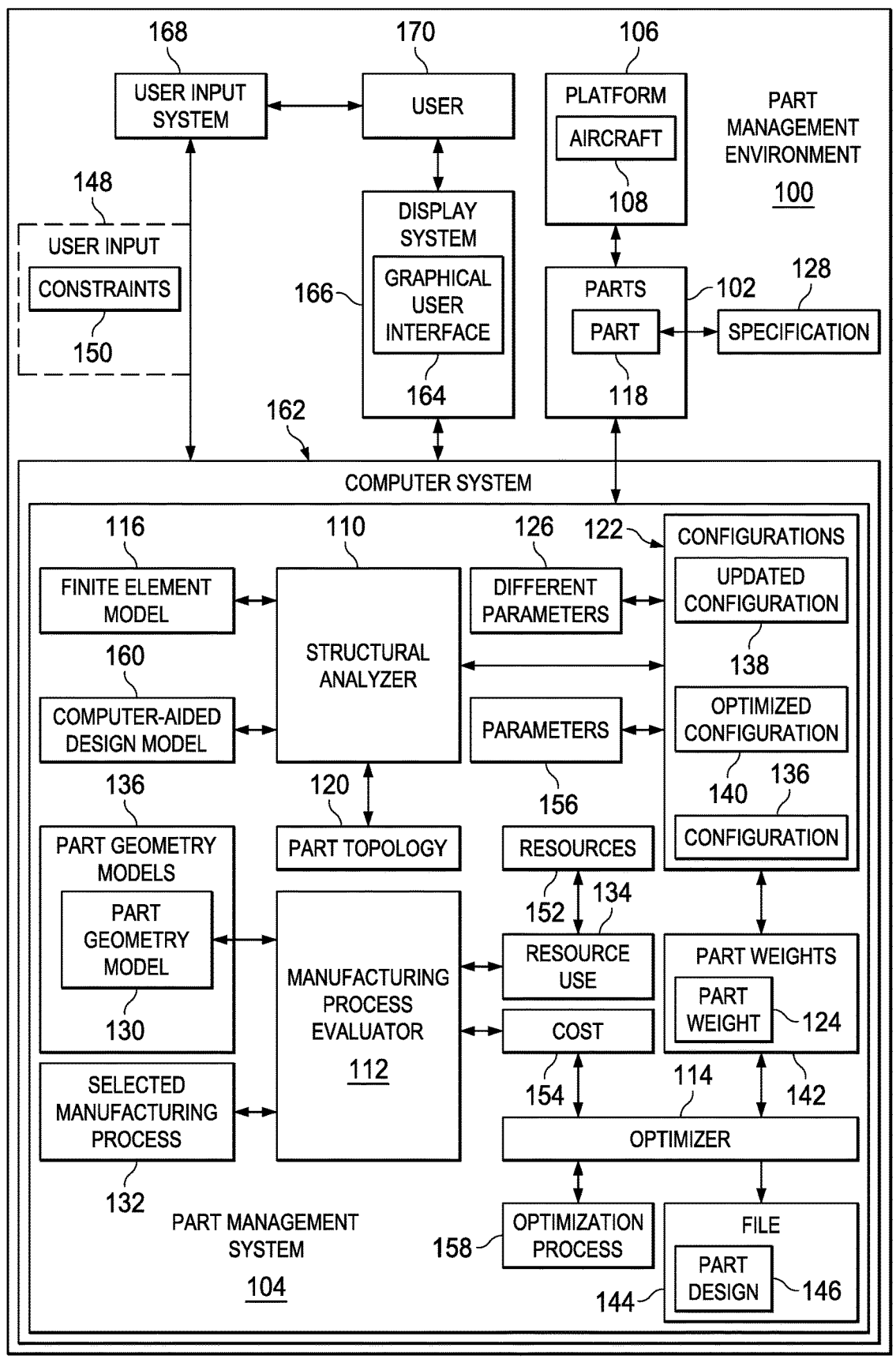
FIG. 1 is an illustration of a block diagram of a part management environment in accordance with an illustrative embodiment.

With reference now to the figures, and in particular with reference to FIG. 1, an illustration of a block diagram of a part management environment is depicted in accordance with an illustrative embodiment. In this illustrative example, part management environment 100 is an environment in which parts 102 are managed using part management system 104. In this illustrative example, parts 102 may be assembled to form platform 106. In this illustrative example, platform 106 takes the form of aircraft 108.

Part management system 104 may manage parts 102 in a number different ways. For example, in managing parts 102, part management system 104 may perform operations including at least one of designing, modifying, manufacturing, assembling, testing, or performing other operations with respect to parts 102.

As used herein, the phrase "at least one of", when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

As depicted, part management system 104 may include a number of different components. In this illustrative example, part management system 104 includes structural analyzer 110, manufacturing process evaluator 112, and optimizer 114. These components may be implemented in a number of different ways. For example, the components may be implemented using or may include at least one of a knowledge-based engineering tool, natural language processing, a neural network, a knowledge base, a statistical model, or some other suitable process or technique.

In this particular example, structural analyzer 110 is configured to process finite element model (FEM) 116 for part 118 in parts 102 to refine part topology 120 and generate a number of configurations 122 for part 118. Part topology 120 may be for part design 146 for finite element model 116. In this illustrative example, a configuration is a selection of features for part 118. A feature may be, for example, without limitation, a hole, a flange, a channel, a web, a joint, a contour, or some other suitable type of feature. For example, one configuration may have one hole while another configuration may have three holes, with both configurations meeting specification 128.

Part topology 120 describes geometric properties and spatial relations of different features for part 118. As depicted, part topology 120 may describe a size, a shape, a location, other geometric properties or spatial relations of features for part 118. For example, part topology 120 may describe the size, the shape, and the location of holes in relation to the holes of other features, such as flanges, angles, protrusions, or channels.

Further, some geometric properties may be constant, while others may vary. For example, the size of part 118 may not be constant while the shape and design area are constant.

In another example, the shape of part 118 may not be constant but the size and area may constant. Part topology 120 may be found in at least one of part geometry model 130 or finite element model 116 for part 118.

As depicted, each configuration in the number of configurations 122 has part weight 124 in part weights 142 for the number of configurations 122. In this illustrative example, finite element model 116 is a model that may be analyzed using a finite element analysis process.

As shown in the illustrative example, each configuration in the number of configurations 122 for part 118 has a number of different parameters 126 from other configurations for part 118 that change part weight 124 and meet specification 128 for part 118. A configuration in configurations 122 is a description of an arrangement of elements for part 118.

In this illustrative example, specification 128 sets a standard for describing at least one of a geometry, a weight, a shape, resource use, manufacturing process limits, or other criteria that part 118 is expected to meet. Specification 128 may be based on at least one of a rule, a manufacturer specification, a statute, a regulation, a criteria, or some other suitable guideline.

In processing finite element model 116, structural analyzer 110 is configured to change a number of parameters 156 for at least a portion of the number of configurations 122 for part 118 using optimization process 158 to reduce part weight 124 for the portion of the number of configurations 122 while meeting specification 128 for part 118. The number of parameters 156 may describe at least one of part topology 120 or configuration 136 for part 118. Parameters 156 may include at least one of a width, a length, a circumference, a thickness, a material, a texture, a size, a shape, or other types of parameters for part 118.

Further, in processing finite element model 116, structural analyzer 110 is configured to form finite element model 116 for part 118 from computer-aided design (CAD) model 160 for part 118 for each configuration in the number of configurations 122 for part 118 and generate the number of configurations 122 for part 118 in which each configuration in the number of configurations 122 has part weight 124 by changing a number of parameters 156 in finite element model 116 for at least a portion of the number of configurations 122 for part 118.

In this illustrative example, manufacturing process evaluator 112 is configured to analyze, for each configuration, part geometry model 130 in part geometry models 163 and selected manufacturing process 132 to estimate resource use 134 for the manufacturing of part 118 for each configuration in the number of configurations 122 for part 118.

In the illustrative example, resource use 134 describes the use of resources 152. Resources 152 may include at least one of machining, drilling, molding, labor, material type, number of parts, time to perform a manufacturing process, manufacturing building, an assembly line, a robotic equipment, tooling, preparation time, or other types of resources.

In this illustrative example, part geometry model 130 is data stored in a data structure that describes the geometries of part 118. For example, part geometry model 130 may describe the shape and size for features or parts of part 118. Part geometry model 130 may be part of part design 146. For example, part design 146 may take the form of computer-aided design model 160. Manufacturing process evaluator 112 is configured receive user input 148 identifying constraints 150 on resources 152 available in analyzing resource use 134.

In this illustrative example, graphical user interface 164 is displayed on display system 166. User input 148 may be made through user input system 168 by user 170 to graphical user interface 164 when viewed by user 170.

As depicted, in analyzing each configuration, manufacturing process evaluator 112 is configured to estimate resource use 134 for manufacturing of part 118 for each configuration in the number of configurations 122 for part 118 using part geometry model 130 and selected manufacturing process 132 and estimates cost 154 for resource use 134 estimated for manufacturing part 118 for each configuration in the number of configurations 122 for part 118. In estimating cost 154, manufacturing process evaluator 112 is configured to estimate cost 154 for resource use 134 using at least one of labor rates, material costs, tool information, machinery information, and part information for manufacturing the part for each configuration in the number of configurations 122 for part 118.

Optimizer 114 is configured to iteratively edit configuration 136, refine part topology 120 to generate updated configuration 138 for part 118. Optimizer 114 is also configured to analyze selected manufacturing process 132 to estimate resource use 134 until optimized configuration 140 is identified based on the value for part weights 142 and resource use 134 estimated for the number of configurations 122 processed by part management system 104 for part 118. The editing of configuration 136 includes adding or removing features from configuration 136.

Refining a topology includes changing at least one of a size or shape of part 118. Refining the topology also may include changing at least one of a size, a shape, or topology for a feature. For example, the size, the shape, and the location of holes in relation to other features for a part may be changed to change the topology. These changes may be made while meeting specification 128.

With the identification of optimized configuration 140, optimizer 114 is configured to output file 144 with part design 146 for optimized configuration 140 for part 118, enabling manufacturing for part 118 using part design 146. In this illustrative example, part design 146 includes information about part 118. Part design 146 may include a description of the geometry for part 118, materials, tasks or steps to fabricate part 118, installation instructions, or other suitable types of information.

Further, optimizer 114, responsive to determining that part weight 124 or resource use 134 for configuration 136 is unacceptable, is configured to iteratively edit configuration 136, refine part topology 120 to generate updated configuration 138 for part 118, and analyze selected manufacturing process 132 to estimate resource use 134 using optimization process 158 until an optimized configuration is identified by the optimization process based on the value for part 118 for part weights 142 and the resource use estimated for the number of configurations processed by computer system 162 for the part.

One or more components in part management system 104 may be implemented in software, hardware, firmware or a combination thereof. When software is used, the operations performed by part management system 104 may be implemented in program code configured to run on hardware, such as a processor unit. When firmware is used, the operations performed by part management system 104 may be implemented in program code and data and stored in persistent memory to run on a processor unit. When hardware is employed, the hardware may include circuits that operate to perform the operations in part management system 104.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

In this example, one or more components in part management system 104 may be located in computer system 162. Computer system 162 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

In one illustrative example, one or more technical solutions are present that overcome a technical problem with creating optimal part designs that take into account desired considerations for aircraft parts. As a result, one or more technical solutions may provide a technical effect that enables managing part designs in a more efficient manner as compared to current techniques. For example, one or more technical solutions may include a technical effect of optimizing a part design that takes into account considerations such as weight and resource use. This optimization may iteratively modify part designs in which both weight and resource use are taken into account in parallel or at essentially the same time.

As a result, computer system 162 operates as a special purpose computer system in which part management system 104 in computer system 162 enables managing the part designs in a manner that optimizes the part designs for considerations, such as weight and resource use. In particular, part management system 104 transforms computer system 162 into a special purpose computer system, as compared to currently available general computer systems that do not have part management system 104.

The illustration for part management environment 100 in FIG. 1 is not meant to imply physical or architectural limitations to the manner in which an illustrative embodiment may be implemented. Other components, in addition to or in place of the ones illustrated, may be used. Some components may be unnecessary. Also, the blocks are presented to illustrate some functional components. One or more of these blocks may be combined, divided, or combined and divided into different blocks when implemented in an illustrative embodiment.

For example, although the illustrative examples are described with respect to aircraft 108, another illustrative example may be applied to other types of platforms. Platform 106 in FIG. 1 may be, for example, a mobile platform, a stationary platform, a land-based structure, an aquatic-based structure, and a space-based structure. More specifically, platform 106 may be a surface ship, a tank, a personnel carrier, a train, a spacecraft, a space station, a satellite, a submarine, an automobile, a power plant, a bridge, a dam, a house, a manufacturing facility, a building, and other suitable platforms.

Figure 2:
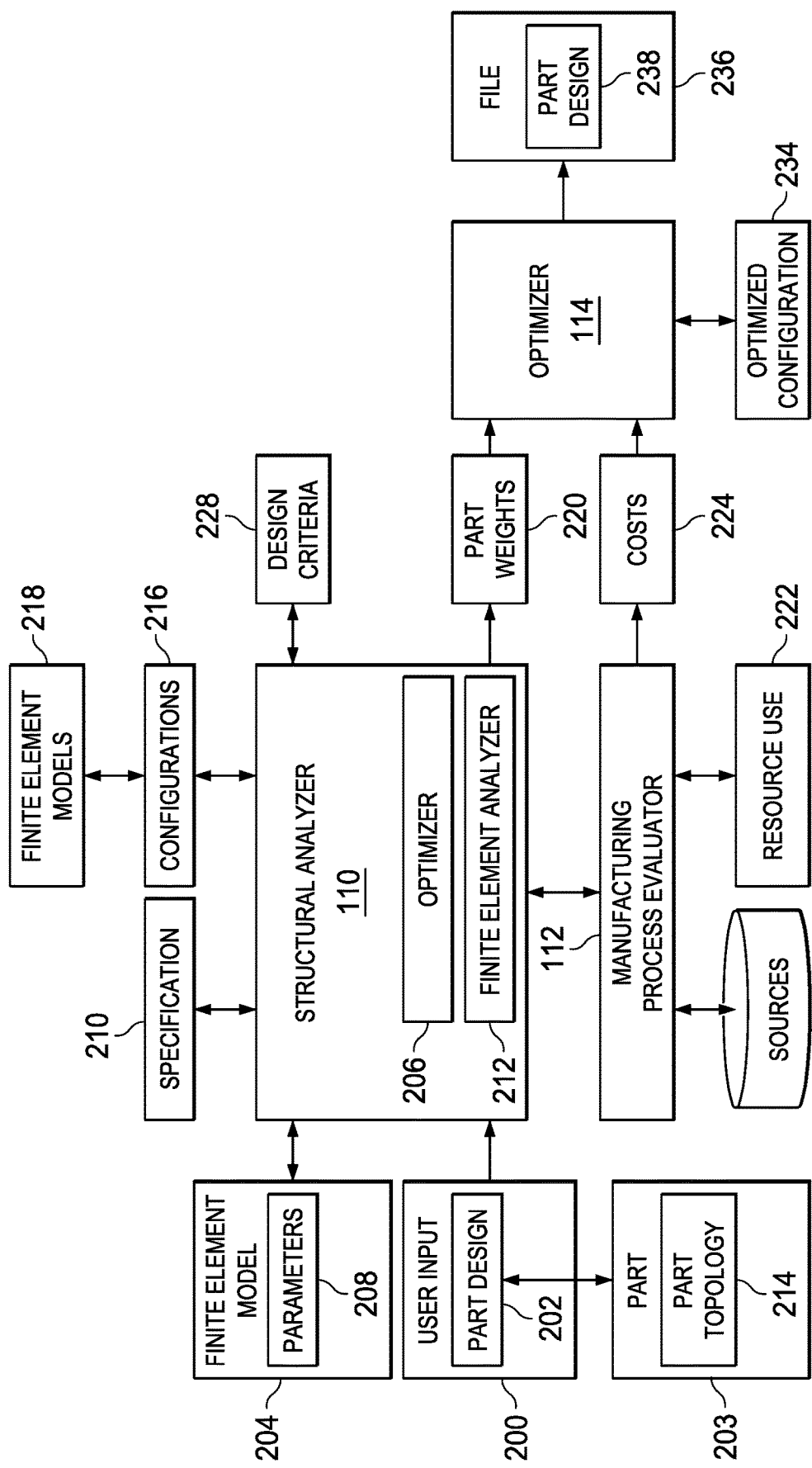
FIG. 2 is an illustration of a dataflow for managing a part design in accordance with an illustrative embodiment.

With reference now to FIG. 2, an illustration of a dataflow for managing a part design is depicted in accordance with an illustrative embodiment. In this illustrative example, the dataflow may be implemented in part management system 104 shown in block form in FIG. 1.

In this illustrative example, structural analyzer 110 receives user input 200 selecting part design 202 for part 203 for management. Part design 202 is a model, such as a computer-aided design (CAD) model, for a part. Structural analyzer 110 creates finite element model (FEM) 204 from part design 202.

Finite element model 204 may be optimized prior to analysis. For example, structural analyzer 110 may include optimizer 206. Optimizer 206 may be utilized to modify finite element model 204 to optimize finite element model 204 to meet desired structural capabilities while reducing weight. Optimizer 206 may be implemented using various currently available solutions, such as, for example, without limitation, OptiStruct available from Altair Engineering, Inc.

For example, optimizer 206 may be used to change parameters 208 in finite element model 204 to meet specification 210. These changes may include changes to parameters 208 in finite element model 204 selected from at least one of a material type, a manufacturing process, a location of manufacture, a labor type, or other suitable parameters. In this illustrative example, these changes may refine part topology 214 for part 203. The refining comprises making changes to part topology 214 that reaches an objective. In this example, the objective is reducing the weight and cost. In other examples, the objective may be reducing the weight or cost.

With optimizer 206, structural analyzer 110 generates finite element models 218 for configurations 216 of part design 202 for part 203. Each configuration of the number of configurations 216 is represented by a corresponding finite element model in finite element models 218, which may be based off of finite element model 204.

Finite element analyzer 212 implements a finite element method utilized to perform an analysis of finite element model 204 with any refinements or changes made by optimizer 206. In this illustrative example, finite element analyzer 212 performs an analysis of finite element models 218 and outputs part weights 220 for the different ones of configurations 216. Each configuration of a finite element model in finite element models 218 corresponds to a configuration in the number of configurations 216.

Additionally, manufacturing process evaluator 112 may operate in parallel to structural analyzer 110. In this illustrative example, manufacturing process evaluator 112 also receives user input 200 selecting part design 202. In this illustrative example, manufacturing process evaluator 112 analyzes one or more of configurations 216 of finite element models 218 generated by optimizer 206 in structural analyzer 110. Configurations 216 of finite element models 218 are different versions of a finite element model, corresponding to the different versions of part 118. Depending on the implementation, only a single configuration in configurations 216 may be analyzed.

In this illustrative example, manufacturing process evaluator 112 analyzes a number of configurations 216 to identify costs for each of configurations 216. The analysis may be performed using a number of different analysis processes.

For example, manufacturing process evaluator 112 may implement statistical modeling in the form of a regression analysis to estimates relationships of resource use 222 to costs 224 for configurations 216. Examples of different types of regression analysis techniques include linear regression, simple regression, ordinary least squares, polynomial regression, general linear model, discrete choice, logistic regression, nonlinear regression, and other types of regression analysis techniques. Other optimization processes such as a global optimization process or a genetic algorithm also may be used.

Manufacturing process evaluator 112 may obtain data for resource use 222 from a number of sources 226. Sources 226 may be at least one of a database, a simulation process, or other suitable sources. The simulation process may be implemented in a program such as, for example, without limitation, aPriori Product Cost Management platform, which is available from aPriori. A product management database or some other suitable type of database that includes information for identifying costs 224 for configurations 216. Manufacturing process evaluator 112, such as aPriori, is configured to utilize a computer-aided design model representing the given part, to generate a tool path and estimated time for machining the part configuration (based on the tool path, machinery, and tooling).

Accordingly, Manufacturing process evaluator 112 may determine a cost associated with machining a given part configuration associated with a parameter of a manufacturing process for producing a curved surface profile machined by a particular machining tool, such as a filet feature in the part design. Manufacturing process evaluator 112 may also determine the cost associated with the estimated time for machining a different part configuration associated with a different parameter for another manufacturing process that does not include the particular machining tooling or curved surface, which would result in a different part weight. Manufacturing process evaluator 112 may determine the cost associated with machining a given part configuration associated with a parameter of a different machining equipment, which may be associated with a given manufacturing location that has constraints on the types of machining equipment may be available. Parameters that may be present in resource use 222 include at least one of machining, drilling, molding, labor, a material type, a number of parts, time to perform a manufacturing process, manufacturing building, an assembly line, a robotic equipment, tooling, or preparation time.

As a result, manufacturing process evaluator 112 identifies costs for configurations 216. In turn, optimizer 114 may optimize part design 202 based on part weights 220 and cost 224. A determination may be made as to whether any of configurations 216 meet design criteria 228. Design criteria 228 may specify a desired weight, cost, or some combination thereof that meets specification 210 for part 203.

In response to part weights 220 or resource use 222 not meeting design criteria 228, optimizer 114 may cause optimizer 206 in structural analyzer 110 to modify configurations 216. Modifying configurations 216 may include changing one or more of configurations 216, creating one of or more new configurations, or some combination thereof. The modifications may occur with an objective of reducing weight through changes to the geometries of part 203. In this manner, an iterative process may be performed to generate updated configurations for the number of configurations 216 by changing the parts geometry, material type, or part design features such as filets or holes, for example, and to analyze resource use 222 for selected manufacturing processes used in configurations 216 until at least one of optimized configuration 234 is identified as meeting design criteria 228.

When one of the number of configurations 216 is identified as meeting design criteria 228, that configuration is identified as optimized configuration 234, which optimizer 114 outputs as file 236. File 236 includes part design 238 for optimized configuration 234.

Figure 3:
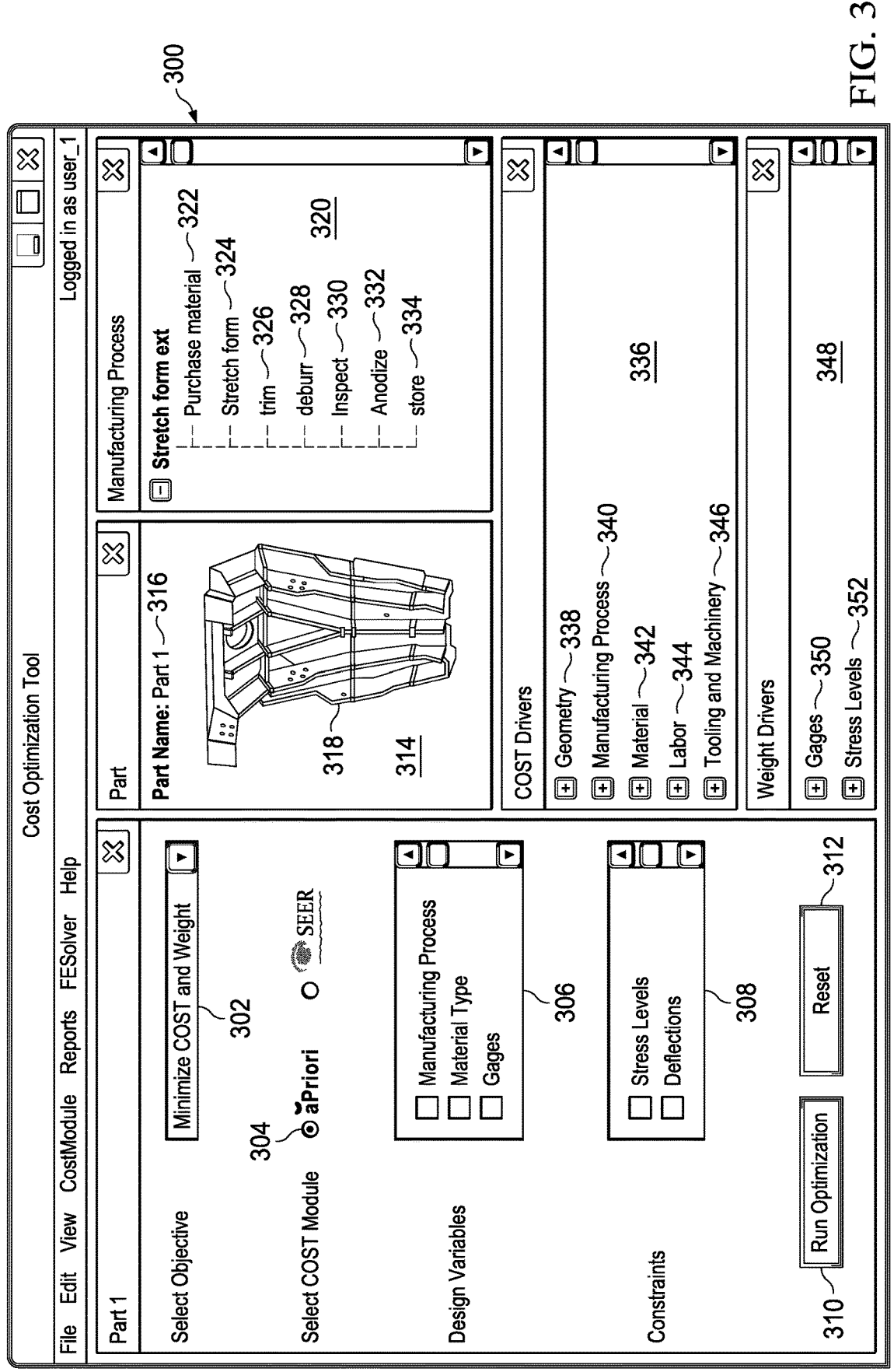
FIG. 3 is an illustration of a graphical user interface in accordance with an illustrative embodiment.

With reference now to FIG. 3, an illustration of a graphical user interface is depicted in accordance with an illustrative embodiment. In this illustrative example, graphical user interface 300 is an example of one implementation for graphical user interface 164 shown in block form in FIG. 1.

In this illustrative example, graphical user interface 300 includes select objective section 302, select cost module section 304, design variables section 306, and constraints section 308. In this section, select objective section 302 allows for an objective to be selected such as minimizing cost and weight as depicted in this illustrative example. Select cost module section 304 allows for user input to select the particular process for evaluating resource use in the form of cost.

Design variables section 306 may receive user input selecting variables that are used in evaluating resource use and weight of the part. Constraints section 308 allows for selecting constraints utilized in the evaluation of the part.

Run optimization button 310 may be selected when the optimization process should be performed. Reset button 312 allows for resetting objective section 302, select cost module section 304, design variables section 306, and constraints section 308 to default values.

In this illustrative example, section 314 displays a part that has been selected for evaluation. In this example, section 314 includes part name 316 and graphic 318 for the part. Manufacturing process section 320 displays manufacturing processes that may be performed in fabricating the part. In this example, the manufacturing processes include purchase material 322, stretch form 324, trim 326, deburr 328, inspect 330, anodized 332, and store 334.

Cost drivers section 336 is an example of parameters that may be taken into account in evaluating resource use. In this example, cost drivers section 336 includes geometry 338, manufacturing process 340, material 342, labor 344, and tooling and machinery 346.

Weight drivers section 348 identifies parameters that are used in the evaluation of weight. In this example, weight drivers section 348 includes gauges 350 and stress levels 352.

Figure 4:
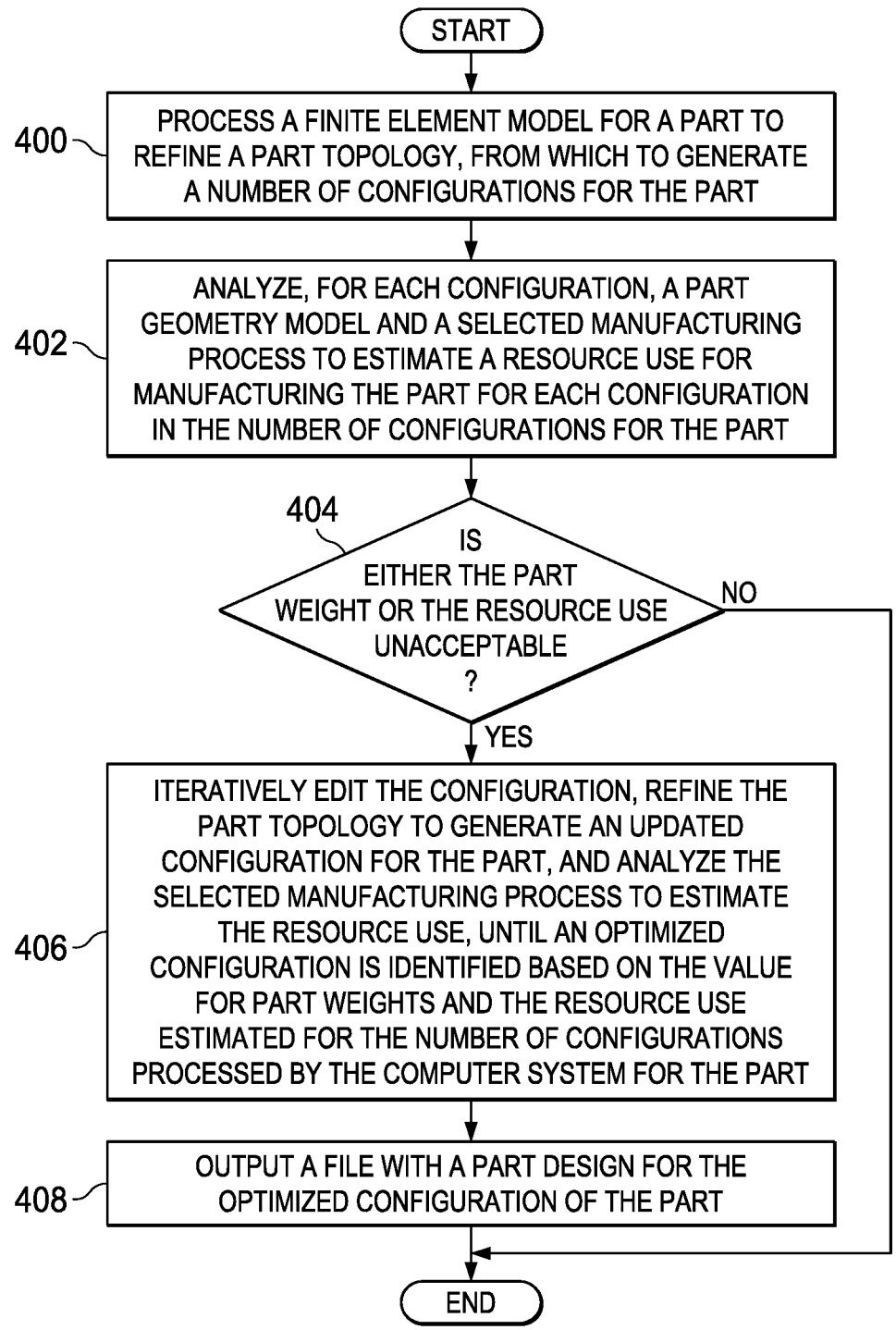
FIG. 4 is an illustration of a flowchart of a process for managing a part design in accordance with an illustrative embodiment.

Turning next to FIG. 4, an illustration of a flowchart of a process for managing a part design is depicted in accordance with an illustrative embodiment. The process illustrated in FIG. 4 may be implemented in part management system 104 in FIG. 1. This process may be implemented using at least one of program code or hardware. Program code implements operations for managing a part design and runs on a processing unit in a computer system, such as computer system 162 in FIG. 1.

The process begins by processing a finite element model for a part to refine a part topology, from which to generate a number of configurations for the part (operation 400). In operation 400, each configuration in the number of configurations has a part weight and each configuration in the number of configurations for the part has a number of different parameters from other configurations for the part that change the part weight and meet a specification for the part.

The process analyzes, for each configuration, a part geometry model and a selected manufacturing process to estimate a resource use for manufacturing the part for each configuration in the number of configurations for the part (operation 402).

A determination is made as to whether either the part weight or the resource use are unacceptable (operation 404). In response to a determination that the part weight or resource use for a configuration is unacceptable, the process iteratively edits the configuration (by changes made to the part geometry or design features such as filets, material, tooling or machinery type, gauge level, target stress level, etc.), refines the part topology to generate an updated configuration for the part, and analyzes the selected manufacturing process to estimate the resource use, until an optimized configuration is identified based on the value for the part weights and the resource use estimated for the number of configurations processed by the computer system for the part (operation 406). The process outputs a file with a part design for the optimized configuration of the part (operation 408). The process terminates thereafter.

With reference again to operation 404, if the part weight and resource use are acceptable, the process terminates. Thus, the process illustrated in FIG. 4 enables manufacturing of the part using the part design. In particular, the part design with the optimized configuration for the part provides an ability to consider factors to both reduce resource use and weight.

Figure 5:
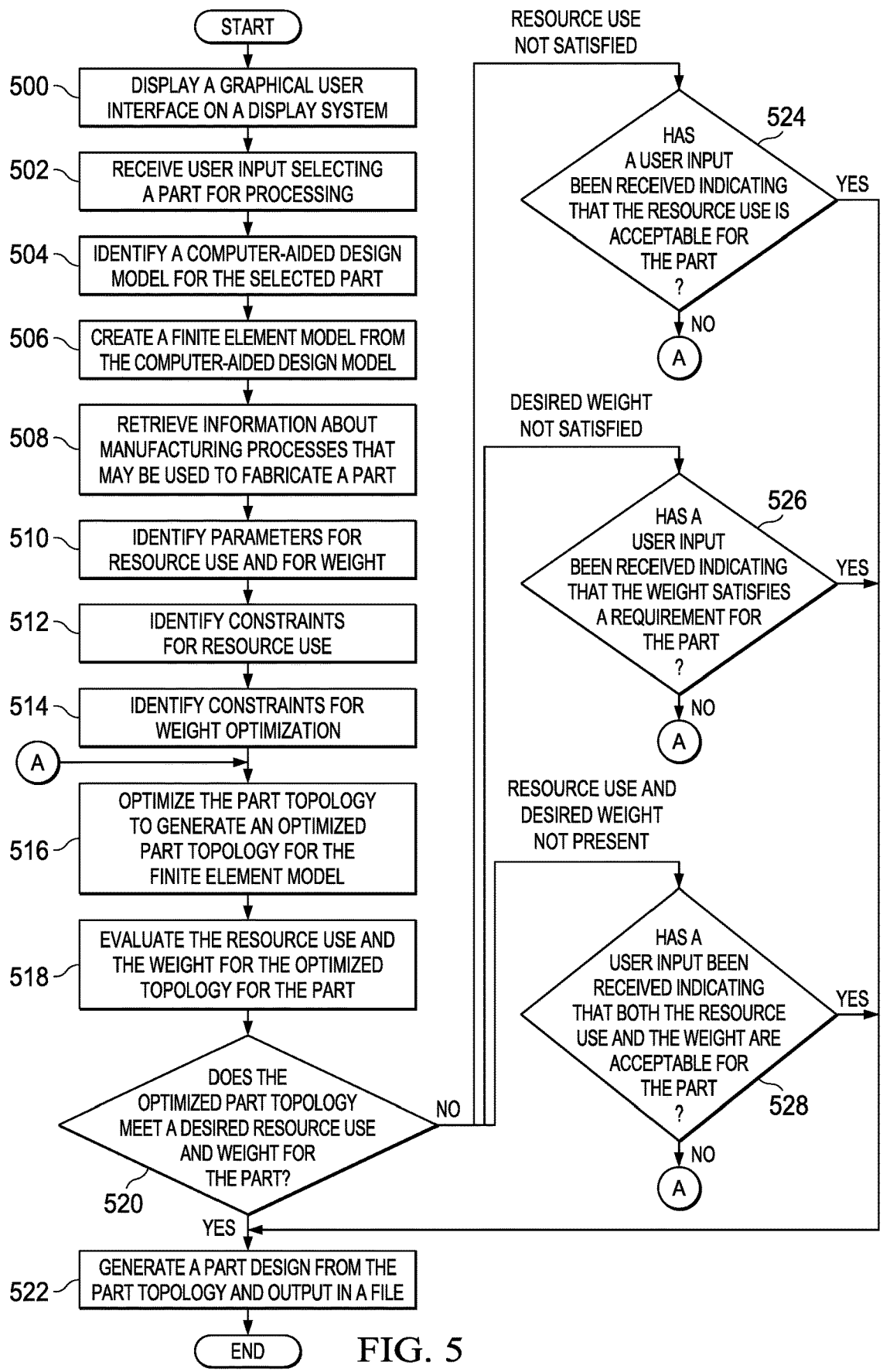
FIG. 5 is an illustration of a flowchart of a process for managing a part design in accordance with an illustrative embodiment.

With reference now to FIG. 5, an illustration of a flowchart of a process for managing a part design is depicted in accordance with an illustrative embodiment. The process illustrated in FIG. 5 may be implemented in part management system 104 in FIG. 1. This process may be implemented using at least one of program code or hardware. Program code implements operations for managing a part design and runs on a processing unit in a computer system, such as computer system 162 in FIG. 1.

The process begins by displaying a graphical user interface on a display system (operation 500). In this illustrative example, the graphical user interface may be displayed on computer system 162. The process receives user input selecting a part for processing (operation 502). The process identifies a computer-aided design model for the selected part (operation 504).

The computer-aided design model may be, for example, computer-aided design model 160 in FIG. 1. The process creates a finite element model from the computer-aided design model (operation 506). The finite element model may be, for example, finite element model 116 in FIG. 1 or finite element model 204 in FIG. 2.

The process retrieves information about manufacturing processes that may be used to fabricate a part (operation 508). The process identifies parameters for resource use and for weight (operation 510). Examples of parameters for resource use include at least one of a material type, a selected manufacturing process, a location of manufacture, a labor type, or other types of parameters related to resource use. The resource use may be used to identify the cost for the part. The parameters for weight may be obtained from a specification for the part.

The process identifies constraints for resource use (operation 512). These constraints on the resource use maybe based on cost. For example, the constraints on cost may be selected from at least one of material cost, labor cost, tooling and machinery type or cost, machinery location, building location, building labor rates, shop rates, or other suitable types of constraints relating to cost through resource use. The process also identifies constraints for weight optimization (operation 514).

These constraints on resource use and cost may be identified in a number of different ways. For example, the constraints may be received through a user input to the graphical user interface, in a specification, or from some other source. The constraints may be, for example, amounts of stress, a deflection, labor cost, tooling and machinery type or cost, machinery location and availability, building location, building rates, and shop rates, where the constraints affect evaluation of the configurations.

The process then optimizes the part topology to generate an optimized part topology for the finite element model (operation 516). The part topology may be, for example, part topology 120 in FIG. 1 or part topology 214 in FIG. 2. The number of optimized part topology results in an updated or optimized finite element model reflecting the changes from the original finite element model generated from the computer-aided design model.

The process then evaluates the resource use and the weight for the optimized topology for the part (operation 518). The valuation of the resource use and the weight may be performed using the resulting finite element model reflecting the optimized part topology. The evaluation of resource use considers constraints, which may be, for example, amounts of stress, a deflection, labor cost, tooling and machinery type or cost, machinery location and availability, building location, building rates, and shop rates, where the constraints affect evaluation of the configurations.

For example, a part configuration of a stringer having an associated model may be analyzed by structural analyzer, and also may be evaluated by manufacturing process evaluator 112 as a first configuration machined from a 2 inch thick plate by machinery having a constraint of being located in only a single manufacturing location, and as a second configuration utilizing an additive manufacturing process (that adds material to a 1 inch plate) using machinery having a constraint of being located in two manufacturing locations with different labor rates. Depending on constraints on resource use and cost, one configuration may result in an estimate of resource use for manufacturing the part that is determined to have an acceptable part weight and resource use, while another configuration may result in an estimate of resource use for manufacturing the part that is not acceptable.

A determination is made as to whether the optimized part topology meets a desired resource use and weight for the part (operation 520). The desired resource use may be predetermined cost defined in a specification or through some other source. The desired weight also may be defined through a specification or some other source.

If the part topology meets the desired resource use and the weight, a part design is generated from the part topology and output in a file (operation 522). Part designs generated by part management system 104 in FIG. 1 may be utilized to manufacture parts during component and subassembly manufacturing, which may be manufactured using manufacturing processes, tooling, machinery, material type, etc., that were identified by the evaluation process for identifying at least one optimized configuration from the number of configurations. The process terminates thereafter.

With reference again to operation 520, if a desired resource is not present, a determination is made as to whether the desired resource use has not been satisfied, a determination is made as to whether a user input has been received indicating that the resource use is acceptable for the part (operation 524). If the resource use is acceptable, the process proceeds to operation 522. Otherwise, the process returns to operation 516 to update the part topology as part of an iterative process.

With reference again to operation 520, if the desired weight has not been satisfied, a determination is made as to whether a user input has been received indicating that the weight satisfies a requirement for the part (operation 526). If the user input indicates that the weight is acceptable for the part, the process proceeds to operation 522. Otherwise, the process returns to operation 516.

Turning back to operation 520 if both the resource use and desired weight are not present, and a determination is made as to whether user input has been received indicating that both the resource use and weight are acceptable for the part (operation 528). If the user input indicates that both the resource use and weight are acceptable, the process proceeds to operation 522. Otherwise, the process returns operation 516.

Figure 6:
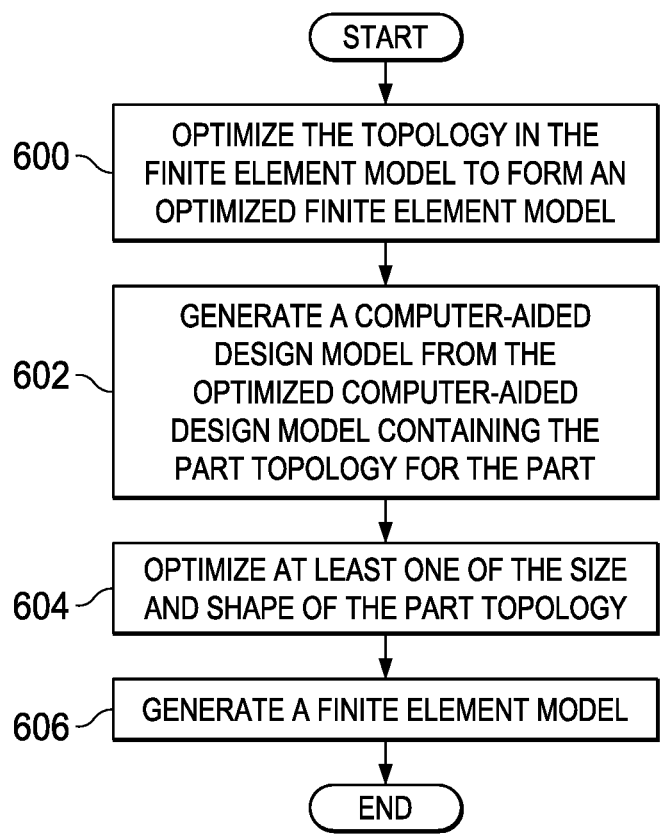
FIG. 6 is an illustration of a flowchart of a process for optimizing a part topology in accordance with an illustrative embodiment.

With reference now to FIG. 6, an illustration of a flowchart of a process for optimizing a part topology is depicted in accordance with an illustrative embodiment. The process illustrated in FIG. 6 is an example of one implementation for operation 516 in FIG. 5A.

The process begins by optimizing the topology in the finite element model to form an optimized finite element model (operation 600). The optimization of the topology in the finite element model is performed to reduce weight. The optimization also may include meeting constraints, such as stress or deflection.

The process then generates a computer-aided design model from the optimized computer-aided design model containing the part topology for the part (operation 602). The process optimizes at least one of the size and shape of the part topology (operation 604). This optimization may be performed using a number of different types of currently available optimization processes. For example, for example, without limitation, OptiStruct available from Altair Engineering, Inc is an example of one process that may be implemented in operation 604. This optimization may be performed based on the selection of the manufacturing process and also may take into account constraints, such as the availability of resources at a manufacturing facility, equipment, assembly-line setups, or other constraints.

The process then generates a finite element model (operation 606). The process terminates thereafter. The finite element model may be used to identify the weight of the parts and for use in performing an evaluation of the resource use.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

For example, the process illustrated in the flowchart in FIG. 5 may be performed for multiple part topologies at the same time, rather than a single part topology. For example, two or more part topologies may be optimized in which the optimized sessions are different for each of these apologies. These multiple part topologies may then be evaluated for resource use and cost at the same time.

Figure 7:
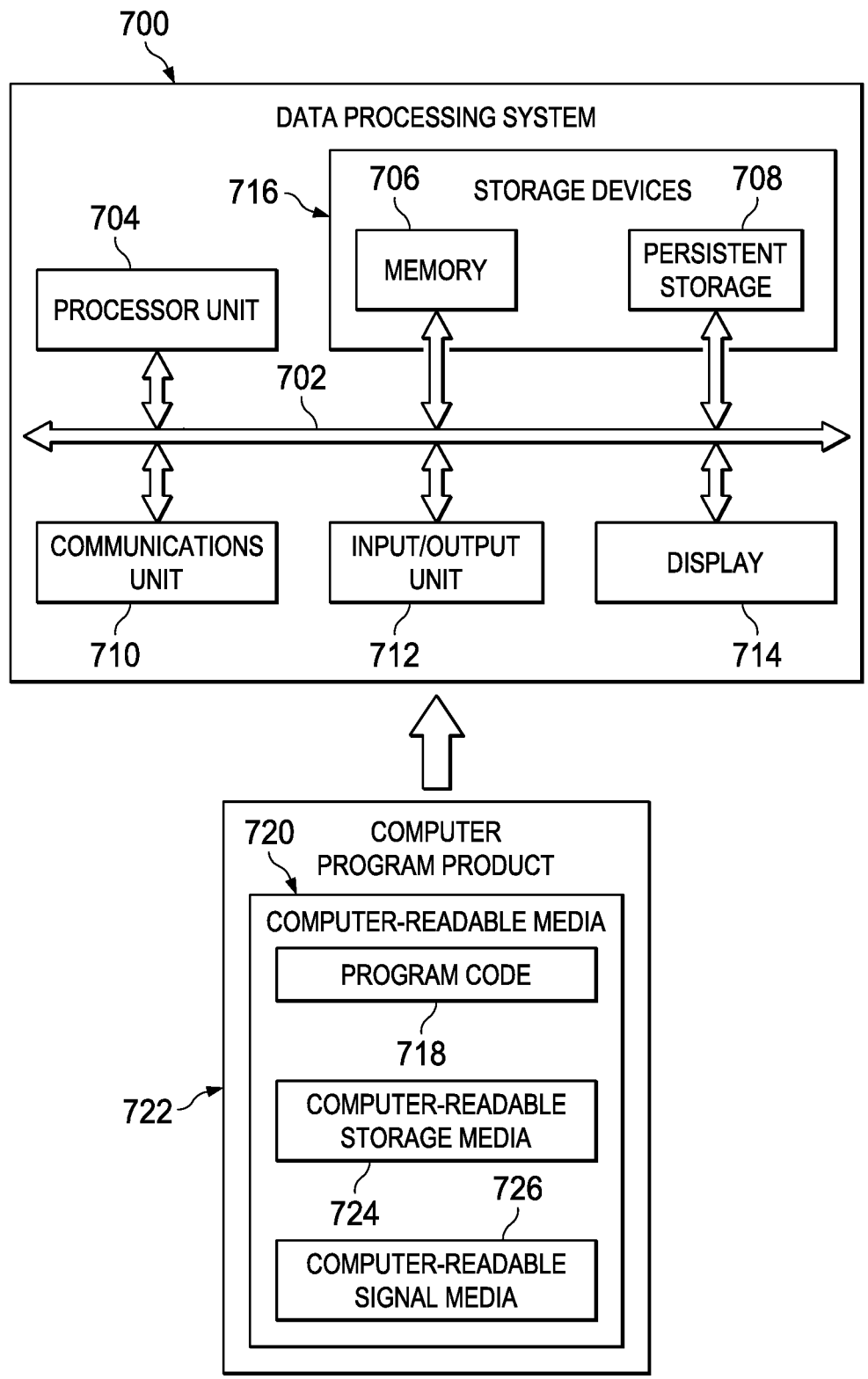
FIG. 7 is an illustration of a block diagram of a data processing system in accordance with an illustrative embodiment.

Turning now to FIG. 7, an illustration of a block diagram of a data processing system is depicted in accordance with an illustrative embodiment. Data processing system 700 may be used to implement computer system 162 in FIG. 1. In this illustrative example, data processing system 700 includes communications framework 702, which provides communications between processor unit 704, memory 706, persistent storage 708, communications unit 710, input/output unit 712, and display 714. In this example, communications framework 702 may take the form of a bus system.

Processor unit 704 serves to execute instructions for software that may be loaded into memory 706. Processor unit 704 may be a number of processors, a multi-processor core, or some other type of processor, depending on the particular implementation.

Memory 706 and persistent storage 708 are examples of storage devices 716. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 716 may also be referred to as computer-readable storage devices in these illustrative examples. Memory 706, in these examples, may be, for example, a random-access memory or any other suitable volatile or non-volatile storage device. Persistent storage 708 may take various forms, depending on the particular implementation.

For example, persistent storage 708 may contain one or more components or devices. For example, persistent storage 708 may be a hard drive, a solid state hard drive, a flash memory, a rewritable optical disk, a rewritable magnetic tape, or some combination of the above. The media used by persistent storage 708 also may be removable. For example, a removable hard drive may be used for persistent storage 708.

Communications unit 710, in these illustrative examples, provides for communications with other data processing systems or devices. In these illustrative examples, communications unit 710 is a network interface card.

Input/output unit 712 allows for input and output of data with other devices that may be connected to data processing system 700. For example, input/output unit 712 may provide a connection for user input through at least one of a keyboard, a mouse, or some other suitable input device. Further, input/output unit 712 may send output to a printer. Display 714 provides a mechanism to display information to a user.

Instructions for at least one of the operating system, applications, or programs may be located in storage devices 716, which are in communication with processor unit 704 through communications framework 702. The processes of the different embodiments may be performed by processor unit 704 using computer-implemented instructions, which may be located in a memory, such as memory 706.

These instructions are referred to as program code, computer-usable program code, or computer-readable program code that may be read and executed by a processor in processor unit 704. The program code in the different embodiments may be embodied on different physical or computer-readable storage media, such as memory 706 or persistent storage 708.

Program code 718 is located in a functional form on computer-readable media 720 that is selectively removable and may be loaded onto or transferred to data processing system 700 for execution by processor unit 704. Program code 718 and computer-readable media 720 form computer program product 722 in these illustrative examples. In one example, computer-readable media 720 may be computer-readable storage media 724 or computer-readable signal media 726.

In these illustrative examples, computer-readable storage media 724 is a physical or tangible storage device used to store program code 718 rather than a medium that propagates or transmits program code 718.

Alternatively, program code 718 may be transferred to data processing system 700 using computer-readable signal media 726. Computer-readable signal media 726 may be, for example, a propagated data signal containing program code 718. For example, computer-readable signal media 726 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 700 are not meant to provide architectural limitations to the manner in which different embodiments may be implemented. The different illustrative embodiments may be implemented in a data processing system including components in addition to or in place of those illustrated for data processing system 700. Other components shown in FIG. 7 can be varied from the illustrative examples shown. The different embodiments may be implemented using any hardware device or system capable of running program code 718.

Figure 8:
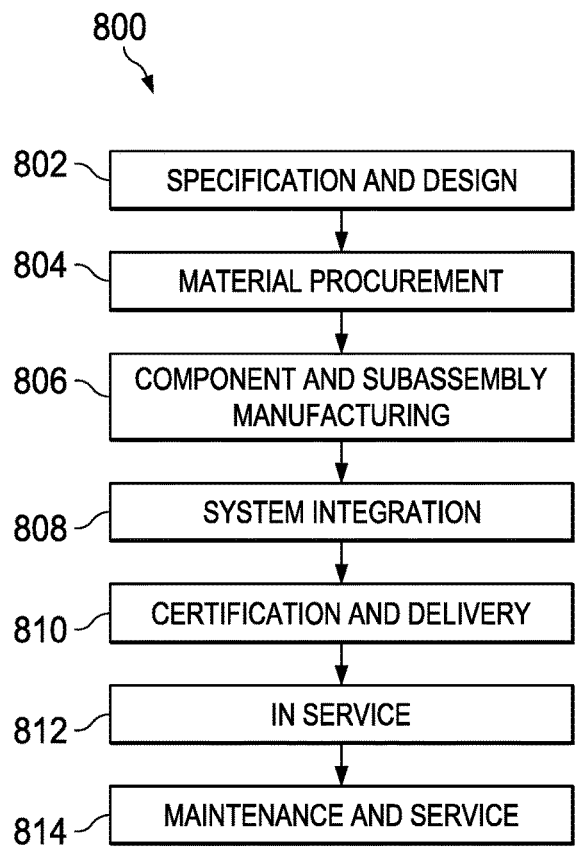
FIG. 8 is an illustration of a block diagram of an aircraft manufacturing and service method in accordance with an illustrative embodiment.
Figure 9:
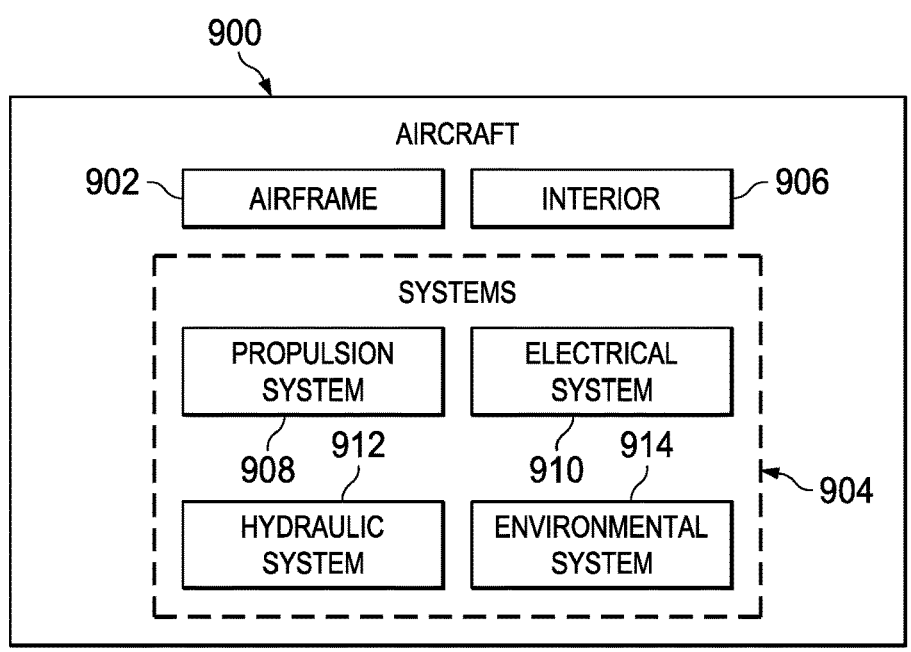
FIG. 9 is an illustration of a block diagram of an aircraft in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of a block diagram of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 may go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of a block diagram of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry. Apparatuses and methods embodied herein may be employed during at least one of the stages of aircraft manufacturing and service method 800 in FIG. 8.

In one illustrative example, components or subassemblies produced in component and subassembly manufacturing 806 in FIG. 8 may be fabricated or manufactured in a manner similar to components or subassemblies produced while aircraft 900 is in service 812 in FIG. 8. As yet another example, one or more apparatus embodiments, method embodiments, or a combination thereof may be utilized during production stages, such as component and subassembly manufacturing 806 and system integration 808 in FIG. 8. One or more apparatus embodiments, method embodiments, or a combination thereof may be utilized while aircraft 900 is in service 812, during maintenance and service 814 in FIG. 8, or both. The use of a number of the different illustrative embodiments may substantially expedite the assembly of aircraft 900, reduce the cost of aircraft 900, or both expedite the assembly of aircraft 900 and reduce the cost of aircraft 900.

For example, part management system 104 shown in FIG. 1 may be used during specification and design 802 to manage part designs for parts for assembling aircraft 900. Part designs generated by part management system 104 may be utilized to manufacture parts during component and subassembly manufacturing 806. Additionally, part management system 104 also may be employed during maintenance and service 814 to generate, modify, or otherwise manage part designs for parts that may be used in routine maintenance, modification, reconfiguration, refurbishment, and other maintenance or service of aircraft 900.

Figure 10:
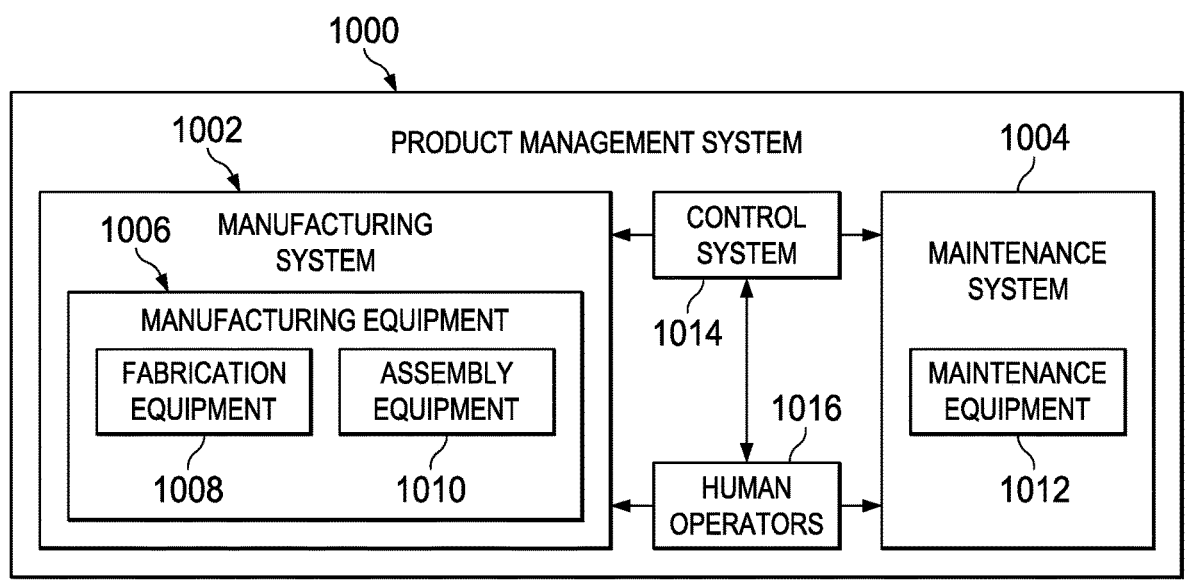
FIG. 10 is an illustration of a block diagram of a product management system in accordance with an illustrative embodiment.

Turning now to FIG. 10, an illustration of a block diagram of a product management system is depicted in accordance with an illustrative embodiment. Product management system 1000 is a physical hardware system. In this illustrative example, product management system 1000 may include at least one of manufacturing system 1002 or maintenance system 1004.

Manufacturing system 1002 is configured to manufacture products, such as aircraft 900 in FIG. 9. For example, manufacturing system 1002 is configured to manufacture part 118 in FIG. 1 using file 144 with part design 146 for optimized configuration 140 for part 118. As depicted, manufacturing system 1002 includes manufacturing equipment 1006. Manufacturing equipment 1006 includes at least one of fabrication equipment 1008 or assembly equipment 1010.

Fabrication equipment 1008 is equipment that may be used to fabricate components for parts used to form aircraft 900. For example, fabrication equipment 1008 may include machines and tools. These machines and tools may be at least one of a drill, a hydraulic press, a furnace, a mold, a composite tape laying machine, a vacuum system, a lathe, or other suitable types of equipment. Fabrication equipment 1008 may be used to fabricate at least one of metal parts, composite parts, semiconductors, circuits, fasteners, ribs, skin panels, spars, antennas, or other suitable types for parts.

Assembly equipment 1010 is equipment used to assemble parts to form aircraft 900. In particular, assembly equipment 1010 may be used to assemble components and parts to form aircraft 900. Assembly equipment 1010 also may include machines and tools. These machines and tools may be at least one of a robotic arm, a crawler, a faster installation system, a rail-based drilling system, or a robot. Assembly equipment 1010 may be used to assemble parts such as seats, horizontal stabilizers, wings, engines, engine housings, landing gear systems, and other parts for aircraft 900.

In this illustrative example, maintenance system 1004 includes maintenance equipment 1012. Maintenance equipment 1012 may include any equipment needed to perform maintenance on aircraft 900. Maintenance equipment 1012 may include tools for performing different operations on parts on aircraft 900. These operations may include at least one of disassembling parts, refurbishing parts, inspecting parts, reworking parts, manufacturing replacement parts, or other operations for performing maintenance on aircraft 900. These operations may be for routine maintenance, inspections, upgrades, refurbishment, or other types of maintenance operations.

In the illustrative example, maintenance equipment 1012 may include ultrasonic inspection devices, x-ray imaging systems, vision systems, drills, crawlers, and other suitable device. In some cases, maintenance equipment 1012 may include fabrication equipment 1008, assembly equipment 1010, or both to produce and assemble parts that may be needed for maintenance.

Product management system 1000 also includes control system 1014. Control system 1014 is a hardware system and may also include software or other types of components. Control system 1014 is configured to control the operation of at least one of manufacturing system 1002 or maintenance system 1004. In particular, control system 1014 may control the operation of at least one of fabrication equipment 1008, assembly equipment 1010, or maintenance equipment 1012.

The hardware in control system 1014 may be using hardware that may include computers, circuits, networks, and other types of equipment. The control may take the form of direct control of manufacturing equipment 1006. For example, robots, computer-controlled machines, and other equipment may be controlled by control system 1014. In other illustrative examples, control system 1014 may manage operations performed by human operators 1016 in manufacturing or performing maintenance on aircraft 900. For example, control system 1014 may assign tasks, provide instructions, display models, or perform other operations to manage operations performed by human operators 1016.

In these illustrative examples, part management system 104 in FIG. 1 and the different components in the system may be implemented in control system 1014 to manage at least one of the manufacturing or maintenance of aircraft 900 in FIG. 9. For example, file 144 in FIG. 1 or file 236 in FIG. 2 output from part management system 104 in FIG. 1 may be used to control the operation of at least one of manufacturing system 1002 or maintenance system 1004. File 144 or file 236 may be used to generate work orders, instructions, program code, or other forms of information that may be used to manage parts 102 in FIG. 1 used within product management system 1000 as well as manufacturing platforms such as an aircraft, spacecraft, ship, submarine, or other type of platform.

In the different illustrative examples, human operators 1016 may operate or interact with at least one of manufacturing equipment 1006, maintenance equipment 1012, or control system 1014. This interaction may be performed to manufacture aircraft 900 in FIG. 9.

Of course, product management system 1000 may be configured to manage other products other than aircraft 900. Although product management system 1000 has been described with respect to manufacturing in the aerospace industry, product management system 1000 may be configured to manage products for other industries. For example, product management system 1000 may be configured to manufacture products for the automotive industry as well as any other suitable industries.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a part design, the method comprising:
   processing, by a computer system, a finite element model for a part to refine a part topology and generate a number of configurations for the part in which each configuration in the number of configurations has a part weight and each configuration in the number of configurations for the part has a number of different parameters from other configurations for the part that change the part weight and meet a specification for the part;
   analyzing for each configuration, by the computer system, a part geometry model and a selected manufacturing process to estimate costs for a plurality of manufacturing resources used for manufacturing the part for each configuration in the number of configurations for the part, wherein the manufacturing resources include tooling, wherein analyzing the manufacturing process determines a cost associated with an estimated time for machining the part of a given configuration based on a parameter of different machining equipment for each manufacturing location that has a constraint on the types of machining equipment available;

in response to determining, by the computer system, that the part weight or the resource use cost for a configuration is unacceptable, iteratively editing the configuration including adding or removing features, refining the part topology to generate an updated configuration for the part, and analyzing the selected manufacturing process to estimate the manufacturing resource costs and use, until an optimized configuration is identified based on a number for part weights and the resource use cost estimated for the number of configurations processed by the computer system for the part; and outputting, by the computer system, a file with the part design for the optimized configuration of the part, enabling manufacturing of the part using the part design.

2. The method of claim 1 further comprising:
manufacturing the part using the file with the part design for the optimized configuration of the part using the part design.

3. The method of claim 1 further comprising:
receiving a user input identifying constraints on resources available in analyzing the resource use.

4. The method of claim 1, wherein analyzing for each configuration, by the computer system, the part geometry model and the selected manufacturing process, to estimate the resource use for manufacturing the part for each configuration in the number of configurations for the part comprises:
estimating the resource use for manufacturing the part for each configuration in the number of configurations for the part using the part geometry model and the selected manufacturing process; and
estimating a cost for the resource use estimated for manufacturing the part for each configuration in the number of configurations for the part.

5. The method of claim 4, wherein estimating the cost for the resource use estimated for manufacturing the part for each configuration in the number of configurations for the part comprises:
estimating the cost for the resource use using at least one of labor rates, material costs, tool information, machinery information, or part information for manufacturing the part for each configuration in the number of configurations for the part.

6. The method of claim 1, wherein processing, by the computer system, the finite element model for the part to refine the part topology and generate the number of configurations for the part in which each configuration in the number of configurations has the part weight and each configuration in the number of configurations for the part has the number of different parameters from other configurations for the part that change the part weight and meet the specification for the part comprises:
changing a number of parameters for at least a portion of the number of configurations for the part using an optimization process to reduce the part weight for the portion of the number of configurations while meeting the specification for the part.

7. The method of claim 1, wherein processing, by the computer system, the finite element model for the part to refine the part topology and generate the number of configurations for the part in which each configuration in the number of configurations has the part weight and each configuration in the number of configurations for the part has the number of different parameters from other configurations for the part that change the part weight and meet the specification for the part comprises:
forming the finite element model of the part from a computer-aided design model of the part for each configuration in the number of configurations for the part; and
generating the number of configurations for the part in which each configuration in the number of configurations has the part weight by changing a number of parameters in the finite element model for at least a portion of the number of configurations for the part.

8. The method of claim 1, wherein in response to determining, by the computer system, that the part weight or the resource use for a configuration is unacceptable, iteratively editing the configuration, refining the part topology to generate the updated configuration for the part, and analyzing the selected manufacturing process to estimate the resource use, until the optimized configuration is identified based on the number for the part weights and the resource use estimated for the number of configurations processed by the computer system for the part comprises:
in response to determining, by the computer system, that the part weight or the resource use for the configuration is unacceptable, iteratively editing the configuration, refining the part topology to generate the updated configuration for the part, and analyzing a manufacturing process to estimate the resource use using an optimization process, until the optimized configuration is identified by the optimization process based on the number for the part weights and the resource use estimated for the number of configurations processed by the computer system for the part.

9. The method of claim 8, wherein the optimization process is selected from one of a linear regression, a simple regression, ordinary least squares, a polynomial regression, a general linear model, a discrete choice, a logistic regression, a nonlinear regression, a global optimization process, or a genetic algorithm.

10. The method of claim 1, wherein the number of different parameters is selected from at least one of a dimension, a material, a length, a width, a thickness, a number of layers, a shape, a topology, or a size.

11. The method of claim 1, wherein the resource use is selected from at least one of machining, drilling, molding, labor, material type, a number of parts, a time to perform a manufacturing process, manufacturing building, an assembly line, a robotic equipment, tooling, or preparation time.

12. The method of claim 1, wherein the plurality of manufacturing resources further include at least one of:
machining;
drilling;
molding;
labor;
material type;
number of parts;
time to perform a manufacturing process;
manufacturing building;
assembly line;
robotic equipment; or
preparation time.

13. A part management system comprising:
a structural analyzer configured to process a finite element model for a part to refine a part topology and generate a number of configurations for the part in which each configuration in the number of configurations has a part weight and each configuration in the number of configurations for the part has a number of different parameters from other configurations for the part that change the part weight and meet a specification for the part;

a manufacturing process evaluator configured to analyze for each configuration a part geometry model and a selected manufacturing process; estimate costs for a plurality of manufacturing resources used for manufacturing the part for each configuration in the number of configurations for the part, wherein the manufacturing resources include tooling, wherein the manufacturing process evaluator determines a cost associated with an estimated time for machining the part of a given configuration based on a parameter of different machining equipment for each manufacturing location that has a constraint on the types of machining equipment available; and an optimizer configured to iteratively edit a configuration in the number of configurations including adding or removing features, refine the part topology to generate an updated configuration for the part, and analyze the selected manufacturing process to estimate the manufacturing resource costs and use until an optimized configuration is identified based on a number for part weights and the resource use cost estimated for the number of configurations processed by a computer system for the part and output a file with a part design for the optimized configuration of the part, enabling manufacturing of the part using the part design.

14. The part management system of claim 13 further comprising:
a manufacturing system configured to manufacture the part using the file with the part design for the optimized configuration of the part.

15. The part management system of claim 13, wherein the manufacturing process evaluator is configured to receive a user input identifying constraints on resources available in analyzing the resource use.

16. The part management system of claim 13, wherein in analyzing for each configuration, the part geometry model and the selected manufacturing process, to estimate the resource use for manufacturing the part for each configuration in the number of configurations for the part, the manufacturing process evaluator is configured to estimate the resource use for manufacturing the part for each configuration in the number of configurations for the part using the part geometry model and the selected manufacturing process and estimate a cost for the resource use estimated for manufacturing the part for each configuration in the number of configurations for the part.

17. The part management system of claim 16, wherein in estimating the cost for the resource use estimated for manufacturing the part for each configuration in the number of configurations for the part, the manufacturing process evaluator is configured to estimate the cost for the resource use using at least one of labor rates, material costs, tool information, machinery information, or part information for manufacturing the part for each configuration in the number of configurations for the part.

18. The part management system of claim 13, wherein in processing the finite element model for the part to refine the part topology and generate the number of configurations for the part in which each configuration in the number of configurations has the part weight and each configuration in the number of configurations for the part has the number of different parameters from the other configurations for the part that changes the part weight and meet the specification for the part, the structural analyzer is configured to change a number of parameters for at least a portion of the number of configurations for the part using an optimization process to reduce the part weight for the portion of the number of configurations while meeting the specification for the part.

19. The part management system of claim 13, wherein in processing the finite element model for the part to refine the part topology and generate the number of configurations for the part in which each configuration in the number of configurations has the part weight and each configuration in the number of configurations for the part has the number of different parameters from other configurations for the part that change the part weight and meet the specification for the part, the structural analyzer is configured to form the finite element model of the part from a computer-aided design model of the part for each configuration in the number of configurations for the part and generate the number of configurations for the part in which each configuration in the number of configurations has the part weight by changing a number of parameters in the finite element model for at least a portion of the number of configurations for the part.

20. The part management system of claim 13, wherein in response to determining, by the computer system, that the part weight or the resource use for the configuration is unacceptable, iteratively editing the configuration, refining the part topology to generate the updated configuration for the part, and analyzing the selected manufacturing process to estimate the resource use, until the optimized configuration is identified based on the number for the part weights and the resource use estimated for the number of configurations processed by the computer system for the part, the optimizer is configured, responsive to determining that the part weight or the resource use for the configuration is unacceptable, to iteratively edit the configuration, refine the part topology to generate the updated configuration for the part, and analyze the selected manufacturing process to estimate the resource use using an optimization process, until the optimized configuration is identified by an optimization process based on the number for the part weights and the resource use estimated for the number of configurations processed by the computer system for the part.

21. The part management system of claim 20, wherein the optimization process is selected from one of a linear regression, a simple regression, ordinary least squares, a polynomial regression, a general linear model, a discrete choice, a logistic regression, a nonlinear regression, a global optimization process, or a genetic algorithm.

22. The part management system of claim 13, wherein the number of different parameters is selected from at least one of a dimension, a material, a length, a width, a thickness, a number of layers, a shape, a topology, or a size.

23. The part management system of claim 13, wherein the resource use is selected from at least one of machining, drilling, molding, labor, material type, a number of parts, time to perform a manufacturing process, manufacturing building, an assembly line, a robotic equipment, tooling, or preparation time.

24. The part management system of claim 13, wherein the plurality of manufacturing resources further include at least one of:
machining;
drilling;
molding;
labor;
material type;
number of parts;
time to perform a manufacturing process;
manufacturing building;

assembly line;
robotic equipment; or
preparation time.

25. A product management system comprising:
a control system configured to process a finite element model for a part to refine a part topology and generate a number of configurations for the part in which each configuration in the number of configurations has a part weight and each configuration in the number of configurations for the part has a number of different parameters from other configurations for the part that changes the part weight and meet a specification for the part; analyze for each configuration, a part geometry model and a selected manufacturing process, to estimate costs for a plurality of manufacturing resources used for manufacturing the part for each configuration in the number of configurations for the part, wherein the manufacturing resources include tooling wherein analyzing the manufacturing process determines a cost associated with an estimated time for machining the part of a given configuration based on a parameter of different machining equipment for each manufacturing location that has a constraint on the types of machining equipment available; and iteratively edit a configuration including adding or removing features, refine the part topology to generate an updated configuration for the part, and analyze the selected manufacturing process to estimate the manufacturing resource costs and use until an optimized configuration is identified based on a number for part weights and the resource use cost estimated for the number of configurations processed by a computer system for the part and output a file with a part design for the optimized configuration of the part, enabling manufacturing of the part using the part design.

26. The product management system of claim 25 further comprising:
a manufacturing system configured to manufacture the part under a control of the control system.

27. The product management system of claim 25, wherein the plurality of manufacturing resources further include at least one of:
machining;
drilling;
molding;
labor;
material type;
number of parts;
time to perform a manufacturing process;
manufacturing building;
assembly line;
robotic equipment; or
preparation time.

* * * * *